(12) United States Patent
Freer et al.

(10) Patent No.: US 12,448,356 B2
(45) Date of Patent: Oct. 21, 2025

(54) ORGANIC COMPOUND (OXIME) TO COMBAT CHEMICAL WARFARE AGENTS

(71) Applicant: Prepaire Labs Limited, Abu Dhabi (AE)

(72) Inventors: Carl Freer, Solna (SE); Vicente Jorge Ribas, Barcelona (ES)

(73) Assignee: Prepaire Labs Limited, Abu Dhabi (AE)

( * ) Notice: Subject to any disclaimer, the term of this patent is extended or adjusted under 35 U.S.C. 154(b) by 0 days.

(21) Appl. No.: 18/656,012

(22) Filed: May 6, 2024

(65) Prior Publication Data

US 2025/0214941 A1 Jul. 3, 2025

Related U.S. Application Data

(60) Provisional application No. 63/607,254, filed on Dec. 7, 2023, provisional application No. 63/629,963, filed on May 6, 2023, provisional application No. 63/102,007, filed on May 6, 2023.

(51) Int. Cl.
| | |
|---|---|
| *C07D 215/58* | (2006.01) |
| *A61K 31/04* | (2006.01) |
| *A61K 31/47* | (2006.01) |
| *C07C 251/52* | (2006.01) |

(52) U.S. Cl.
CPC ............ *C07D 215/58* (2013.01); *A61K 31/04* (2013.01); *A61K 31/47* (2013.01); *C07C 251/52* (2013.01)

(58) Field of Classification Search
CPC .... C07D 215/58; C07C 251/52; A61K 31/04; A61K 31/47
See application file for complete search history.

(56) References Cited

U.S. PATENT DOCUMENTS

| | | |
|---|---|---|
| 3,876,697 A | 4/1975 | Hubele |
| 2025/0000851 A1 | 1/2025 | Freer et al. |

FOREIGN PATENT DOCUMENTS

| | | |
|---|---|---|
| WO | WO-2009/068322 A1 | 6/2009 |
| WO | WO-2025/078883 A2 | 4/2025 |

OTHER PUBLICATIONS

Golovko, Chem of HEt Compounds, vol. 39(3), 2003, 344-353. (Year: 2003).*
Hosseini, Iranian Journal of Pharmaceutical Research, 2017, 16(3), 880-892. (Year: 2017).*
Gilchrist, J Chem Soc Perkin Trans 1, 1988, 2169-2173. (Year: 1988).*
Lo, Mol BioSyst, 2014, vol. 10, 2368-2383. (Year: 2014).*
Bedford, J Med Chem, 1986, vol. 29, 2174-2183. (Year: 1986).*
Jiang, Org Biomol Chem, 2021, vol. 19, 10611-10616. (Year: 2021).*
Yu, Chem Commun, 2015, vol. 51, 14897-14900. (Year: 2015).*
Akhmirov, Mendeleev Moccun, 2021, vol. 31, 686-689. (Year: 2021).*
Gorjian, Turk J Chem, 2021, VOI 45, 2007-2012. (Year: 2021).*
Li, Science China Chemistry, Dec. 2021, vol. 64 (12), 2134-2141. (Year: 2021).*
Othman, International Journal of Organic Chemistry, 2021, vol. 11, 187-198. (Year: 2021).*
Qi, Org Lett, 2021, vol. 23, 8549-8553. (Year: 2021).*
Stivanin, J Org Chem, 2021, 6, 17528-17532. (Year: 2021).*
Zhang, J Am Chem Soc, 2021, 143, 21211-21217. (Year: 2021).*
Stojiljkovic, Toxiclogy 416, 2019, 62-74. (Year: 2019).*
Kazakova, Bloorganic Chemistry, 101, 2020, 104001, 1-9. (Year: 2020).*
Hsu et al., "Synthesis and Molecular Properties of Nerve Agent Reactivator HLo-7 Dimethanesulfonate," ACS Medicinal Chemistry Letters 10 (2019): 761-766.
Marrs et al., "The Role of Oximes in the Treatment of Nerve Agent Poisoning in Civilian Casualties," Toxicological Reviews 25.4 (2006): 297-323.
Cadez et al., "Assessment of four organophosphorus pesticides as inhibitors of human acetylcholinesterase and butyrylcholinesterase." Scientific Reports 11 (2021): 21486.
Cattanach et al., "Preparation of 4a-alkoxy-1,2,3,4,4a,9b-hexahydro- and -1,2,3,4-tetra-hydro-benzofuro[3,2-c]pyridines." J Chem Soc (1971): 53-60.
Invitation to Pay Additional Fees for International Application No. PCT/IB24/00713 dated Jun. 30, 2025.
Reeta et al., "An Easy Access to Oxime Ethers by Pd-Catalyzed C—O Cross-Coupling of Activated Aryl Bromides with Ketoximes and Chalcone Oximes." Chinese Journal of Chemistry 38(8) (2020): 830-836.
Souza et al., "Molecular modeling study of uncharged oximes compared to HI-6 and 2-PAM inside human AChE sarin and VX conjugates." ACS Omega 5 (2020): 4490-4500.
Tsuji et al., "New method for the synthesis of nitriles from O-arylaldoximes with ZrCl4." Synthetic Communications 32(24) (2002): 3871-3879.

* cited by examiner

*Primary Examiner* — D Margaret M Seaman
(74) *Attorney, Agent, or Firm* — Foley Hoag LLP; Lucas P. Watkins; David S. Surry

(57) ABSTRACT

Described herein are compounds that reactivate acetylcholinesterase and associated methods of treating organophosphate poisoning.

5 Claims, 6 Drawing Sheets

ORGANIC COMPOUND (OXIME) TO COMBAT CHEMICAL WARFARE AGENTS

CROSS-REFERENCE TO RELATED APPLICATIONS

This application claims the benefit of priority to U.S. Provisional Application Nos. 63/607,254, filed Dec. 7, 2023, and 63/629,963, filed May 6, 2023, and U.S. Non-Provisional application Ser. No. 18/144,191, filed May 6, 2023, the contents of each of which are hereby incorporated by reference in their entirety.

BACKGROUND

Organophosphate poisoning is a serious medical condition resulting from exposure to organophosphate compounds, which are commonly found in insecticides, herbicides, and chemical nerve agents such as VX and sarin. These compounds inhibit the enzyme acetylcholinesterase (AChE), causing an accumulation of acetylcholine in synapses and neuromuscular junctions. This overstimulation of cholinergic receptors leads to a range of symptoms and can be fatal if left untreated.

The symptoms of organophosphate poisoning can be classified into three categories: muscarinic, nicotinic, and central nervous system (CNS) effects. Muscarinic effects include increased salivation, lacrimation, urination, defecation, gastrointestinal motility, and bronchoconstriction. Nicotinic effects involve muscle twitching, weakness, and eventually paralysis. CNS effects manifest as seizures, confusion, ataxia, respiratory depression, and coma. In severe cases, respiratory failure and death may occur.

Organophosphate poisoning nerve agents (i.e., Sarin, Soman, or Tabun) are the most dangerous agents known, triggering seizure activity in the brain and leading to irreversible seizure-related brain damage.

Organophosphate poisoning induces rapid death through different mechanisms, including respiratory and cardiovascular significant dysfunctions. Organophosphate poisoning nerve agents primarily act by inhibiting the enzyme acetylcholinesterase (AChE), causing an acute cholinergic crisis. Accordingly, medical countermeasures (MCMs) aim to minimize the cholinergic crisis upon deactivating AChE at the neuro synaptic and neuromuscular junctions or to remove the neurotoxic agent by some scavenging process.

Alluding to the above, organophosphates are chemicals that can cause poisoning by inhibiting an enzyme called acetylcholinesterase (AChE) in the nervous system. This leads to an accumulation of acetylcholine, a neurotransmitter, and overstimulation of the nervous system, leading to symptoms such as muscle twitching, convulsions, and respiratory failure.

Despite the efforts to develop new oxime-based therapeutics, the standard of care still relies upon a procedure dating from 1960 consisting of a combination of anti-cholinergic drugs (e.g. atropine), pralidoxime (2-PAM), obidoxime and benzodiazepines (e.g. diazepam). New and improved treatments for organophosphate poisoning are needed.

SUMMARY OF THE INVENTION

In certain aspects, provided herein are compounds of Formula (I), or a pharmaceutically acceptable salt thereof:

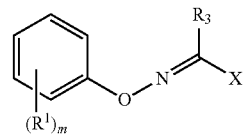

Formula (I)

wherein each $R^1$ is independently selected from nitro and cyano;
m is an integer from 0 to 5;
$R^3$ is selected from H and alkyl;
X is selected from H, alkyl, heterocyclyl, aryl, cycloalkyl, and heteroaryl; or
$R^3$ and X, together with the carbon atom that separates them, complete a 4-6 membered heterocyclyl or cycloalkyl.

In certain aspects, provided herein, are compounds of Formula (III), or a pharmaceutically acceptable salt thereof:

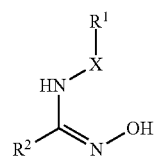

Formula (III)

wherein X is a bond or $SO_2$; and
$R^1$ and $R^2$ are each independently selected from H, alkyl, aryl, heteroaryl, and cycloalkyl; or
$R^1$ and $R^2$, together with the atoms that separate them, complete a 4-8 membered heterocycloalkyl.

In certain aspects, provided herein are compounds of Formula (V), or a pharmaceutically acceptable salt thereof:

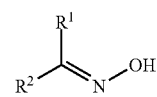

Formula (V)

wherein $R^1$ is H or alkyl; and
$R^2$ is selected from aryl, heteroaryl, heterocyclyl, and cycloalkyl; or
$R^1$ combines with $R^2$ to complete a 4-6 membered ring.

In certain aspects, provided herein, are compounds of Formula (VII) and pharmaceutically acceptable salts thereof:

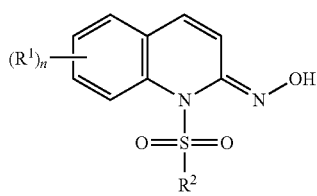

Formula (VII)

wherein each $R^1$ is independently selected from alkyl, cycloalkyl, halo, alkoxy, nitro, cyano, alkenyl, and alkynyl;

$R^2$ is selected from aryl, alkyl, heterocyclyl, heteroaryl, cycloalkyl, alkenyl, and alkynyl; and n is 0-6.

In some embodiments, n is 0.

In certain aspects, provided herein, are compounds of Formula (IX), or pharmaceutically acceptable salts thereof:

Formula (IX)

wherein each $R^1$ is independently selected from alkyl, cycloalkyl, halo, alkoxy, nitro, cyano, alkenyl, and alkynyl;

each $R^2$ is independently selected from alkyl, cycloalkyl, halo, alkoxy, nitro, cyano, alkenyl, and alkynyl;

n is 0-4; and m is 0-5.

DETAILED DESCRIPTION OF THE INVENTION

Figure 1:
FIG. 1 shows in silico results for (NE)-N-[1-(benzenesulfonyl)quinoline-2-ylidene]hydroxylamine binding to AChE inhibited with SARIN.
Figure 2:
FIG. 2 shows in silico results for (E)-N-(2,4-dinitrophenoxy)-1-(4-fluorophenyl)methanimine binding to AChE inhibited with VX/Novichok.
Figure 3:
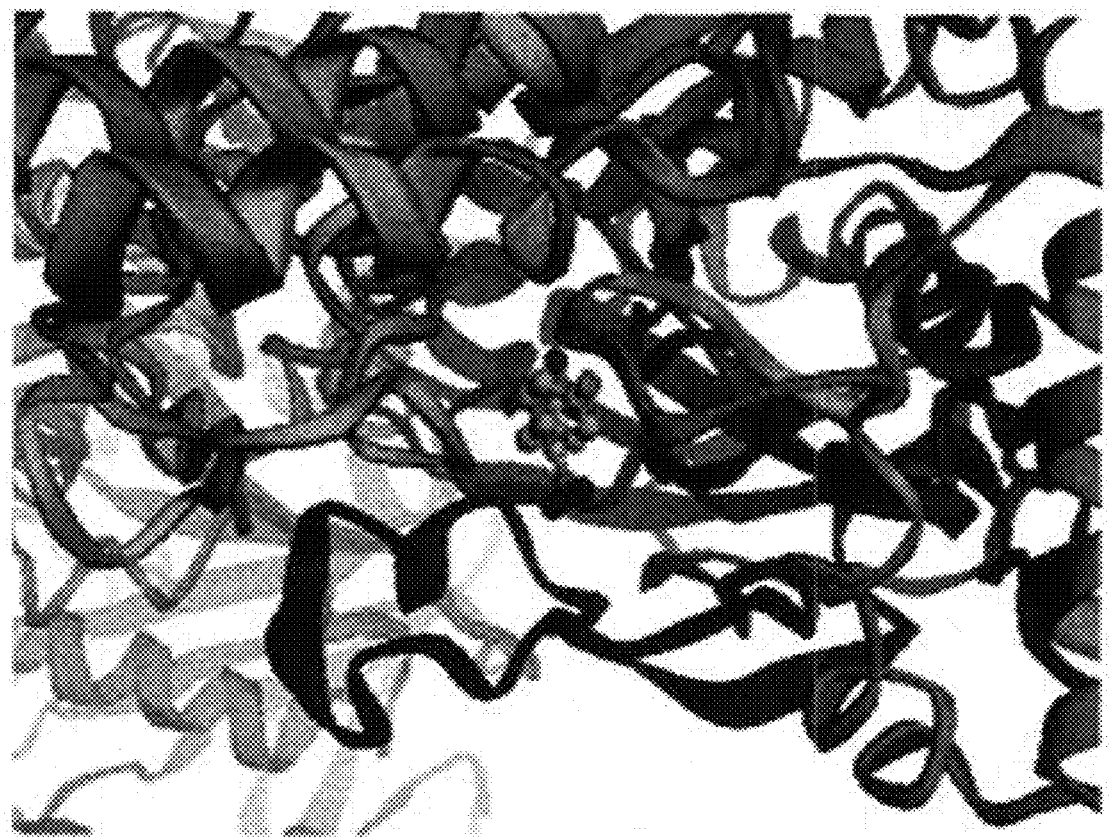
FIG. 3 shows in silico results for (E)-N-(2,4-dinitrophenoxy)-1-(4-fluorophenyl)methanimine binding to AChE inhibited with SARIN.
Figure 4:
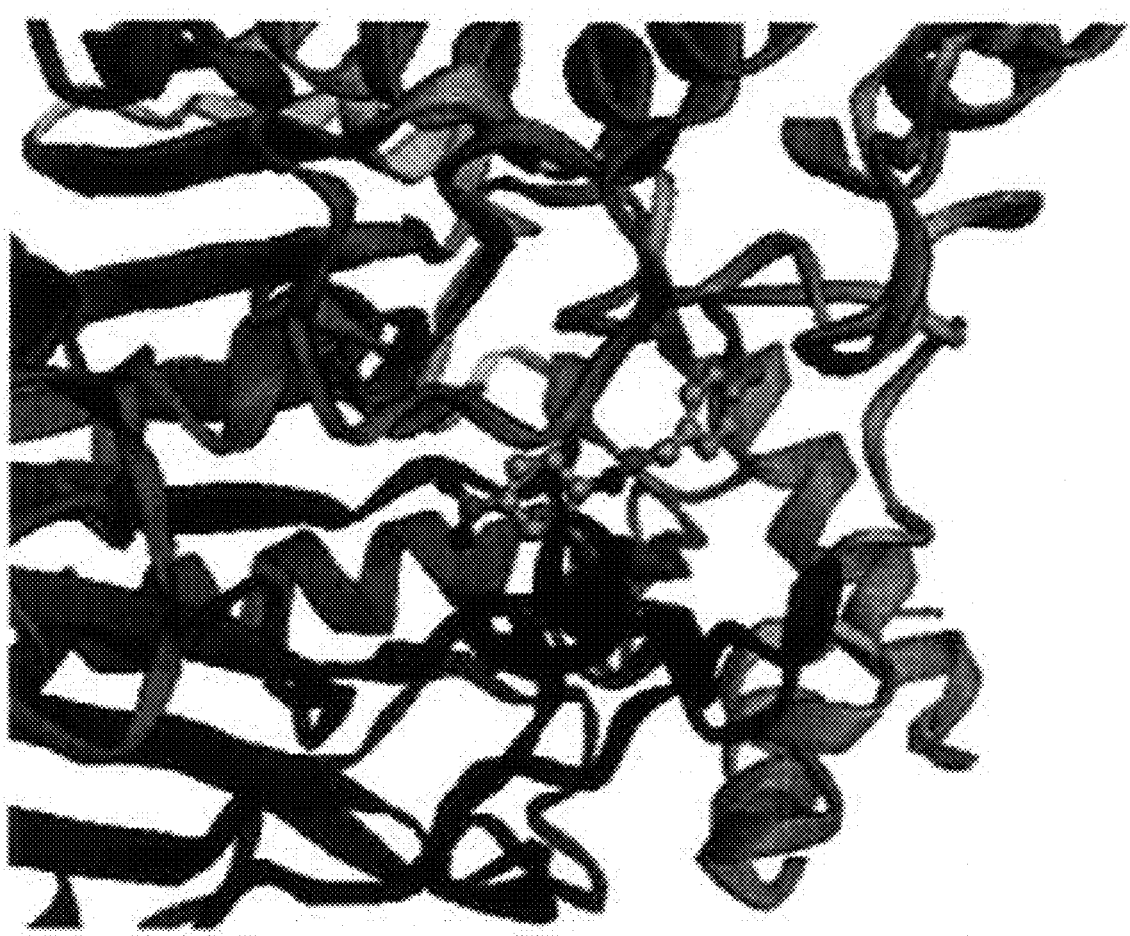
FIG. 4 shows in silico results (E)-N-(2,4-dinitrophenoxy)-1-(4-fluorophenyl)methanimine binding to AChE inhibited with VX/Novichok.
Figure 5:
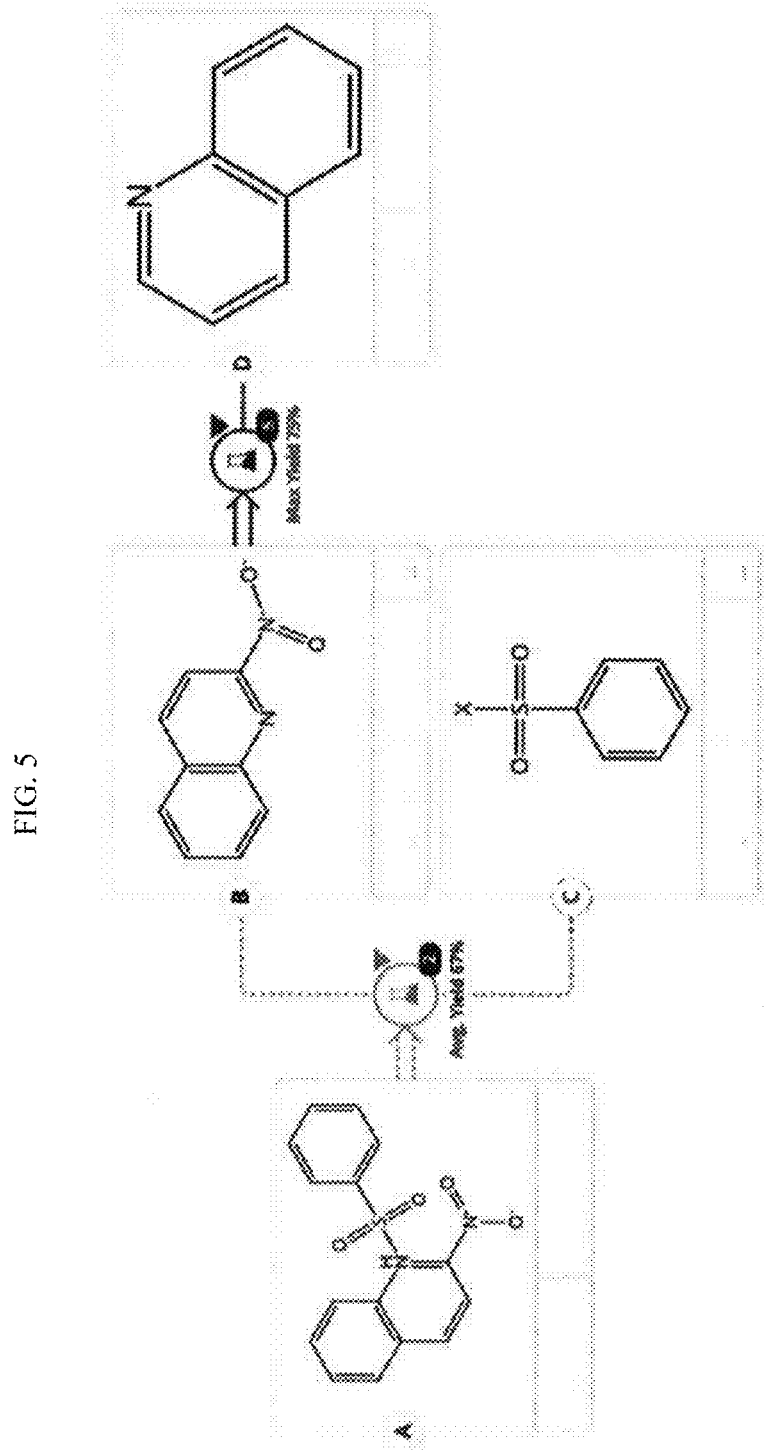
FIG. 5 shows a retrosynthetic process of (NE)-N-[1-(benzenesulfonyl)quinoline-2-ylidene]hydroxylamine.
Figure 6:
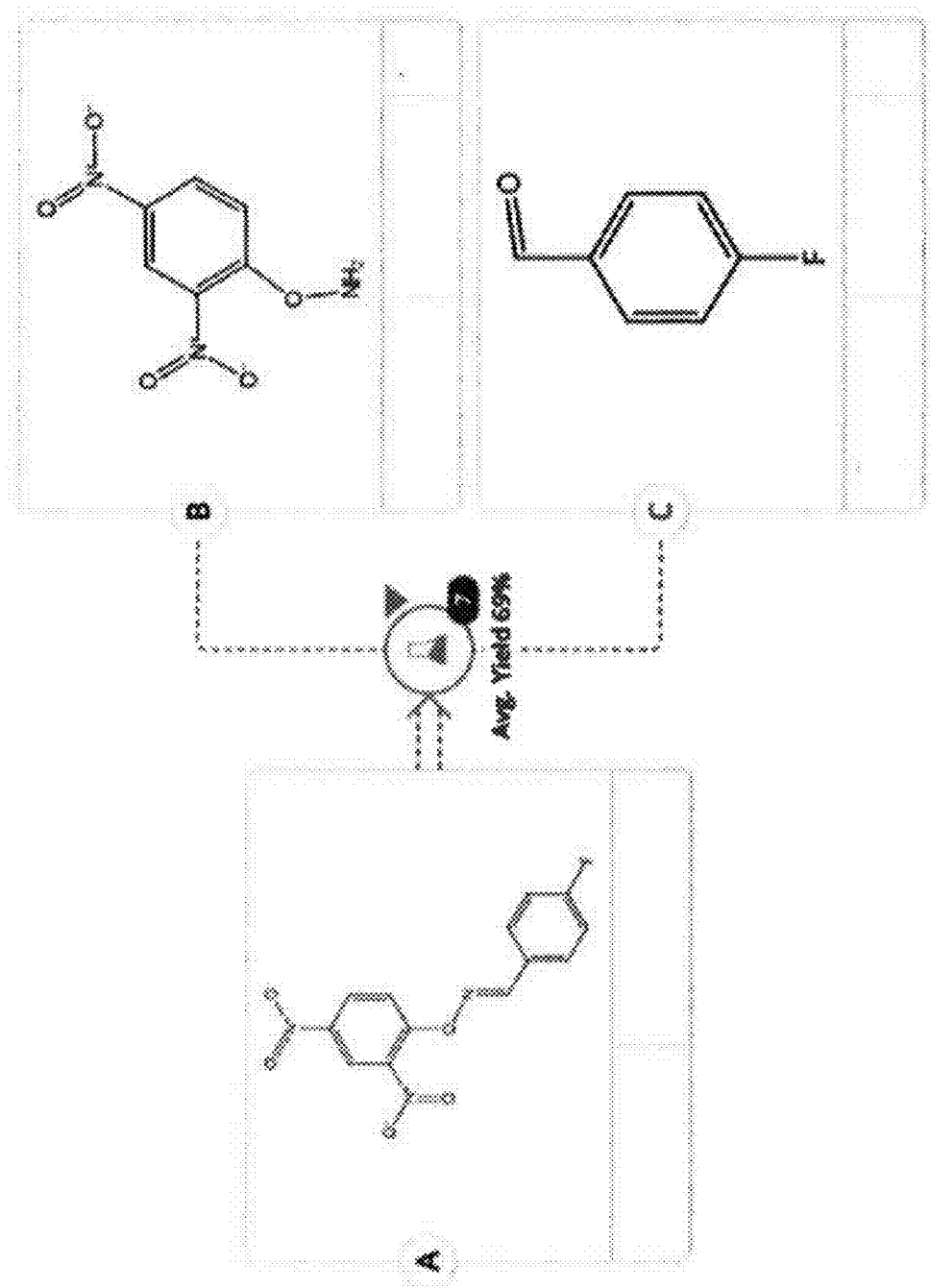
FIG. 6 shows a retrosynthetic process of (E)-N-(2,4-dinitrophenoxy)-1-(4-fluorophenyl)methanimine.

By the way of background and alluding to the above, organophosphates are chemicals that can cause poisoning by inhibiting an enzyme called acetylcholinesterase (AChE) in the nervous system. This leads to an accumulation of acetylcholine, a neurotransmitter, and overstimulation of the nervous system, leading to symptoms such as muscle twitching, convulsions, and respiratory failure.

Oximes work as an antidote for organophosphate poisoning by reactivating the inhibited acetylcholinesterase, thereby reducing the accumulation of acetylcholine and restoring normal nervous system function.

When an organophosphate molecule binds to acetylcholinesterase, it inactivates the enzyme and stops it from breaking down acetylcholine. Oximes are drugs that can help to reverse this inactivation by acting as a "bridge" between the acetylcholinesterase and the organophosphate molecule.

The oxime attaches itself to both the acetylcholinesterase and the organophosphate molecule, helping to break the bond between them. This allows the acetylcholinesterase to regain its normal function, so it can once again break down acetylcholine. This helps to reduce the amount of acetylcholine in the nervous system and relieve the symptoms of organophosphate poisoning.

In essence, the oxime acts as an "intermediary" that helps to restore normal acetylcholinesterase function, thereby reducing the toxic effects of the organophosphate molecule. In certain embodiments, the compounds of the invention are used to combat chemicals causing poisoning of a nervous system of a human by inhibiting an enzyme in the nervous system leading to an accumulation of acetylcholine, a neurotransmitter, and overstimulation of the nervous system, leading to symptoms such as muscle twitching, convulsions, and respiratory failure.

In certain embodiments, the compounds of the invention are used in multi-level and multi-modal data (i.e. data ranging from the chemical level, pathways, and systems levels) through state-of-the-art AI-based solutions and provides a valuable opportunity to further understand the molecular mechanisms of CWA exposure in general, as well as patient phenotyping, assessment of patient trajectories as well as the clinical response to interventions at the onset of CWA exposure.

In certain embodiments, the compounds of the invention provide a fast, available and cost-effective platform for treatment design.

In certain embodiments, the compounds of the invention are used to treat exposure to nervous agents (organophosphores), has and have been tested in-silica for efficacy and safety.

In certain embodiments, the present invention provides the innovative organic compounds (oxime) that will empower caregivers in the use of novel management tools and combination therapies enabling the adoption of more effective management and personalized care by taking a systems-level approach to fine-tuning treatment and vital support.

Tables 1a-1b show the affinity of (E)-N-(2,4-dinitrophenoxy)-1-(4-fluorophenyl)methanamine (1) and (NE)-N-[1-(benzenesulfonyl)quinoline-2-ylidene]hydroxylamine (2) against different AChE inhibited with different organophosphates. (E)-N-(2,4-dinitrophenoxy)-1-(4-fluorophenyl) methanamine (1) present the best reactivation results for most agents tested with good binding affinities for AChE and best median dosage. The differences for VX and A-234 are negligible since they are in linear scale (kcal/mol).

TABLE 1a

| Agent PDB | Sarin 5FPQ | Paraoxon 5HF5 | Paraoxon aged 5HF6 | Paraoxon Acyl 5HF8 |
|---|---|---|---|---|
| | −10.09 | −10.55 | −10.04 | −9.47 |
| | −8.83 | −8.82 | −7.64 | −8.82 |
| | −5.22 | −5.45 | −5.33 | −5.37 |
| | −7.91 | −7.76 | −7.70 | −8.21 |
| | −7.96 | −8.40 | −7.47 | −8.55 |

TABLE 1b

| VX- 6CQT | VX+ 6CQX | VX 6CQZ | A-232 6NTK | A-234 6NTL | Kd | pEC50 | Molecule |
|---|---|---|---|---|---|---|---|
| −9.28 | −10.44 | −4.65 | −10.09 | −10.60 | 4.6 | 3.1 | 2 |
| −8.36 | −8.71 | −4.38 | −9.61 | −8.34 | 5.08 | 2.57 | 1 |
| −5.38 | −5.43 | −3.43 | −5.51 | −5.55 | 4.59 | 2.58 | 2-PAM |
| −7.24 | −7.89 | −4.40 | −8.05 | −7.88 | 5.8 | 2.76 | HI-6 |
| −8.10 | −8.78 | −4.32 | −8.53 | −8.44 | 5.8 | 2.99 | Atropine |

In certain aspects, provided herein, are compounds of Formula (I), or a pharmaceutically acceptable salt thereof:

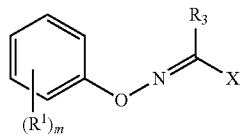

Formula (I)

wherein each $R^1$ is independently selected from nitro and cyano;
m is an integer from 0 to 5;
$R^3$ is selected from H and alkyl;
X is selected from H, alkyl, heterocyclyl, aryl, cycloalkyl, and heteroaryl; or
$R^3$ and X, together with the carbon atom that separates them, complete a 4-6 membered heterocyclyl or cycloalkyl.

In certain embodiments, m is 1 or 2.

In some embodiments, $R^3$ is alkyl. In some embodiments, $R^3$ and X, together with the carbon atom that separates them, complete a 5-6 membered heterocyclic ring. In some embodiments, m is 2. In some embodiments, each instance of $R^1$ is nitro.

In certain embodiments, the compounds have the structure of Formula (IA):

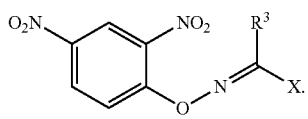

Formula (IA)

In certain embodiments, the compounds have the structure of Formula (II):

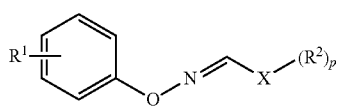

Formula (II)

wherein each $R^2$ is selected from alkyl, amino, carbamate, nitro, hydroxyl, alkoxy (e.g., aralkyloxy), and halo;
wherein $R^3$ is aralkyl;
X is selected from alkyl, heterocyclyl, aryl, polycyclyl, cycloalkyl, and heteroaryl; and
p is an integer from 0-5.
In some embodiments, $R^1$ is nitro.

In certain embodiments, the compounds have the structure of Formula (IIA):

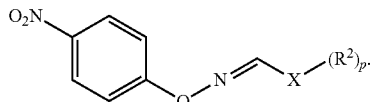

Formula (IIA)

In some embodiments, $R^1$ is cyano.

In certain embodiments, the compounds have the structure of Formula (IIB):

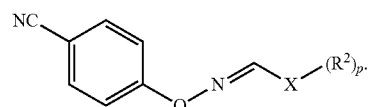

Formula (IIB)

In some embodiments, X is phenyl. In some embodiments, X is heteroaryl. In some embodiments, X is selected from thiophenyl, thiazolyl, furanyl, and pyridinyl. In some embodiments, p is an integer from 0-2. In some embodiments, $R^2$ is selected from methyl, carbamate, halo, nitro, alkoxy, and alkoxy. In some embodiments, $R^2$ is carbamate. In some embodiments, $R^2$ is halo. In some embodiments, $R^2$ is F.

In certain embodiments, provided herein are compounds of Formula (I) having structures selected from:

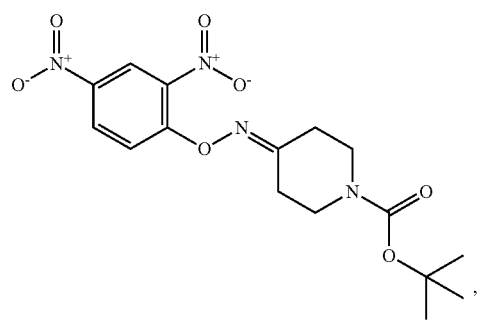

A4

Molecular Weight: 380.36

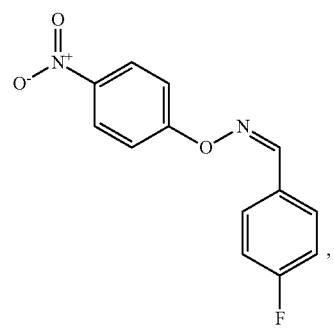
Molecular Weight: 260.22
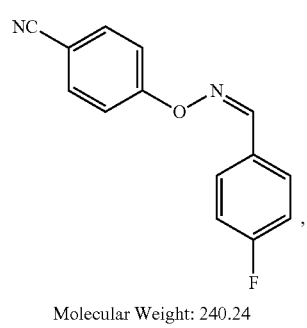
Molecular Weight: 240.24
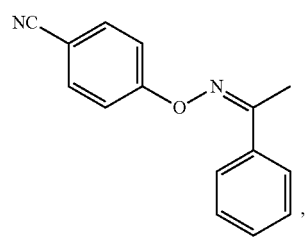
Molecular Weight: 236.27
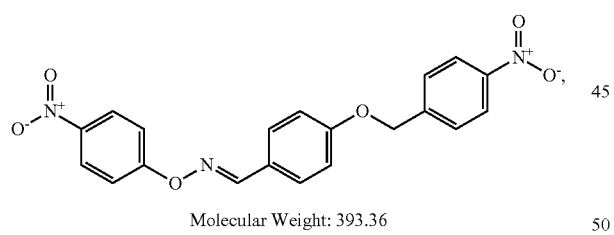
Molecular Weight: 393.36
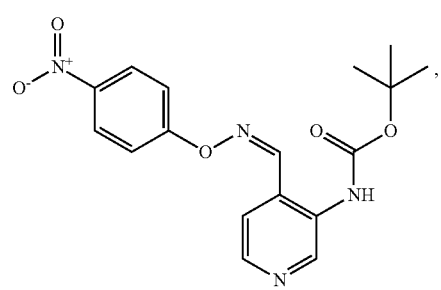
Molecular Weight: 358.35
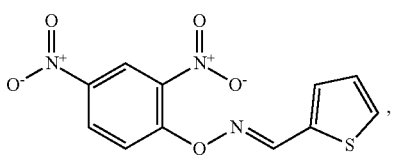
Molecular Weight: 293.25
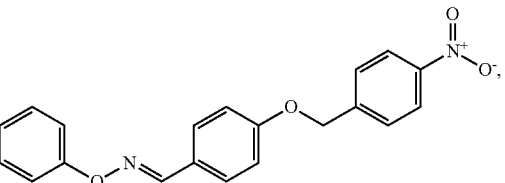
Molecular Weight: 373.37
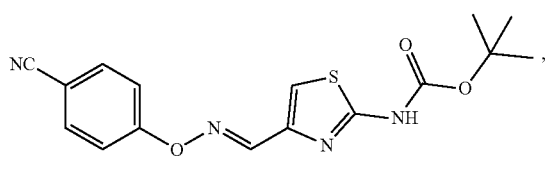
Molecular Weight: 344.39
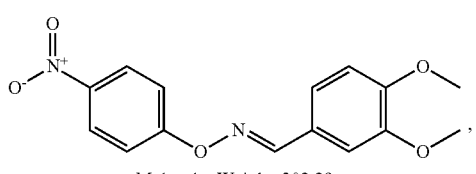
Molecular Weight: 302.29
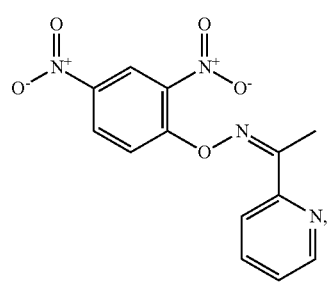
Molecular Weight: 302.25
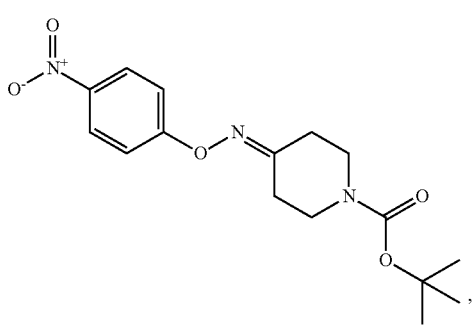
Molecular Weight: 335.36

-continued

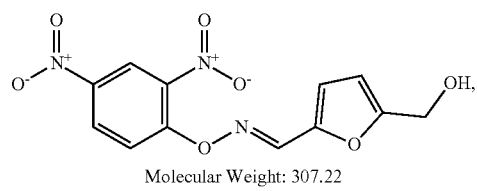
Molecular Weight: 307.22 — A9

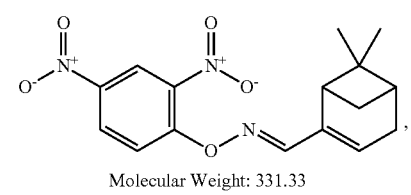
Molecular Weight: 331.33 — A1

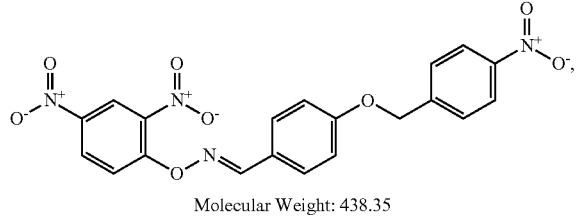
Molecular Weight: 438.35 — A12

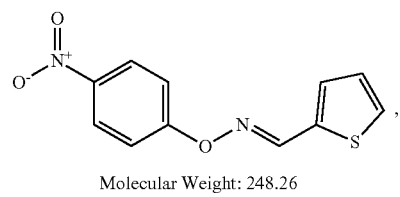
Molecular Weight: 248.26 — A17

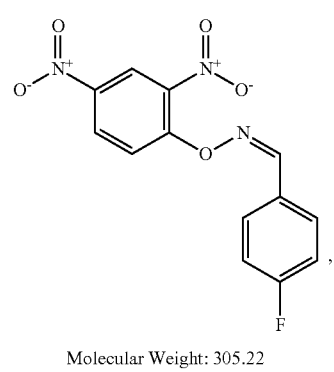
Molecular Weight: 305.22 — A76

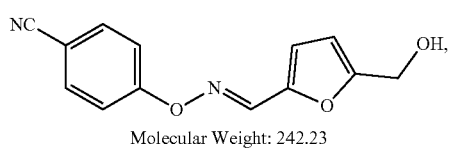
Molecular Weight: 242.23 — A39

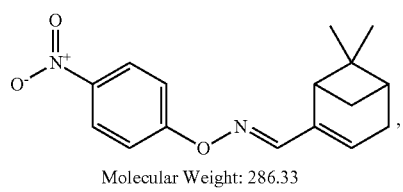
Molecular Weight: 286.33 — A16

-continued

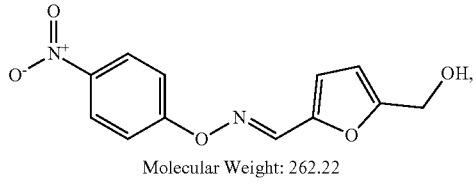
Molecular Weight: 262.22 — A24

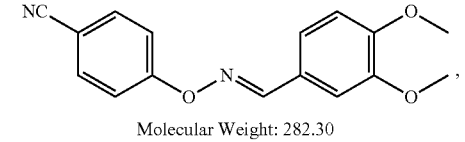
Molecular Weight: 282.30 — A33

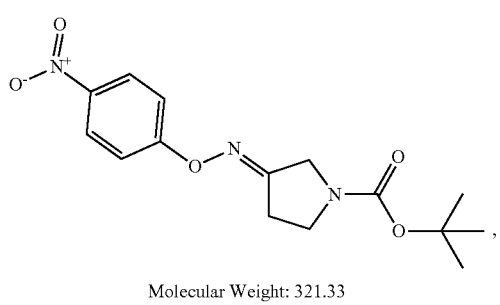
Molecular Weight: 321.33 — A20

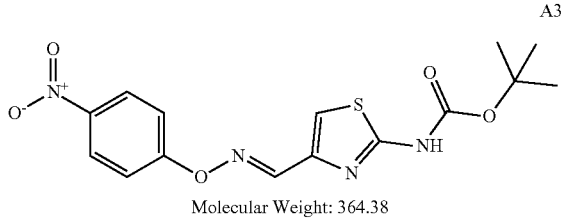
Molecular Weight: 364.38 — A30

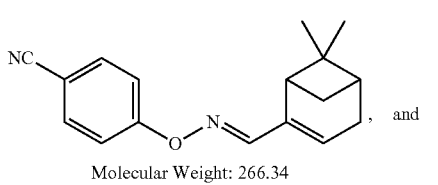
Molecular Weight: 266.34 — A31, and

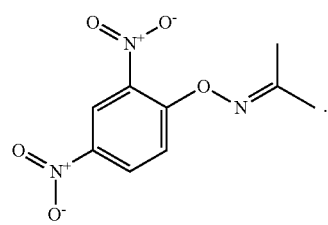
— A83

In certain aspects, provided herein, are compounds of Formula (III), or a pharmaceutically acceptable salt thereof:

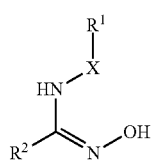

Formula (III)

wherein X is a bond or SO₂; and
R¹ and R² are each independently selected from H, alkyl, aryl, heteroaryl, and cycloalkyl; or
R¹ and R², together with the atoms that separate them, complete a 4-8 membered heterocycloalkyl.

When X is a bond, Nh and R1 are directly bonded to one another. In some embodiments, X is SO₂. In some embodiments, R¹ is alkyl. In some embodiments, R¹ is butyl. In some embodiments, wherein R¹ combines with R² to form a 6-8 membered heterocycloalkyl. In some embodiments, the 6-8 membered heterocycloalkyl is substituted with an aryl.

In certain embodiments, the compounds have the structure of Formula (IV)

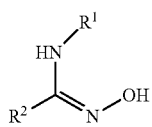

Formula (IV)

wherein R¹ is selected from aryl, heteroaryl, and cycloalkyl.

In some embodiments, R¹ is aryl. In some embodiments, R¹ is phenyl. In some embodiments, R¹ is cycloalkyl. In some embodiments, R¹ is cyclopropyl. In some embodiments, R¹ is substituted one or more substituents selected from halo, nitro, alkyl, and haloalkyl. In some embodiments, R² is alkyl. In some embodiments, R² is methyl. In some embodiments, R² is aryl.

In certain embodiments, R² is

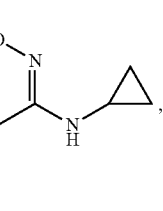

wherein each R³ is independently selected from nitro, cyano, halo, haloalkyl, and alkyl; and m is an integer from 0-5. In some embodiments, R³ is nitro. In some embodiments, R³ is cyano. In some embodiments, R³ is halo. In some embodiments, R³ is bromo. In some embodiments, R³ is alkyl.

In certain embodiments, provided herein, are compounds of Formula (IV) having structures selected from:

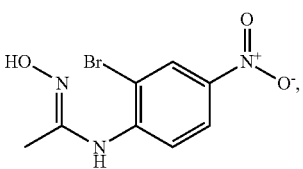

B23

Molecular Weight: 300.11

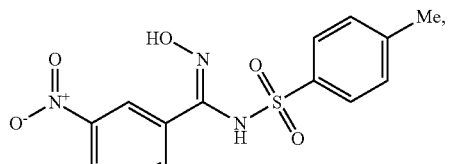

B26

Molecular Weight: 274.07

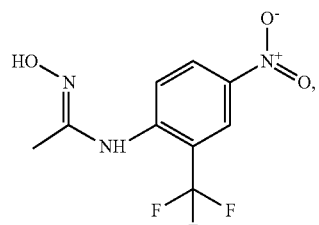

B82

Molecular Weight: 335.33

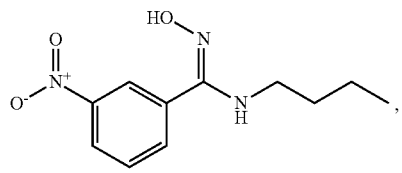

B20

Molecular Weight: 263.18

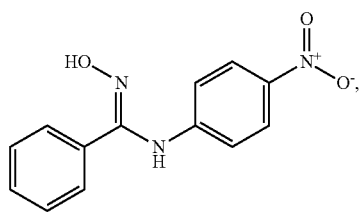

B21

Molecular Weight: 237.26

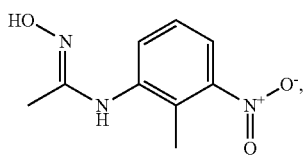

B25

Molecular Weight: 257.25

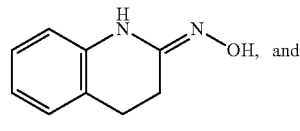

B22

Molecular Weight: 209.21

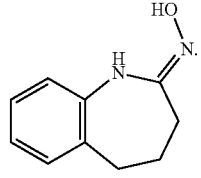

B17

Molecular Weight: 162.19

B19

Molecular Weight: 176.22

In certain aspects, provided herein, are compounds of Formula (V), or a pharmaceutically acceptable salt thereof:

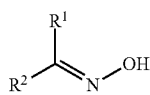
Formula (V)

wherein R¹ is H or alkyl; and

R² is selected from aryl, heteroaryl, heterocyclyl, and cycloalkyl; or

R¹ combines with R² to complete a 4-6 membered ring.

In some embodiments, R¹ is alkyl. In some embodiments, R¹ is methyl. In some embodiments, the 4-6 membered ring is a 5-6 membered ring. In some embodiments, the 4-6 membered ring is a heterocycle. In some embodiments, the 4-6 membered ring is substituted with an alkyl ester.

In certain embodiments, the compounds have the structure of Formula (VI):

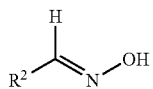
Formula (VI)

wherein R² is selected from, heterocyclyl, aryl, cycloalkyl, and heteroaryl.

In some embodiments, R² is a 5 or 6-membered heterocyclyl or heteroaryl. In some embodiments, R² is a 5 or 6-membered cycloalkyl or aryl. In some embodiments, R² is aryl. In some embodiments, R² is phenyl. In some embodiments, R² is heteroaryl. In some embodiments, R² is

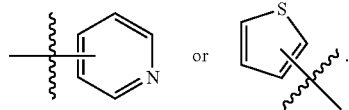

In some embodiments, R² is cycloalkyl. In some embodiments, R² is polycyclic, e.g. bicyclic. In some embodiments, R² is

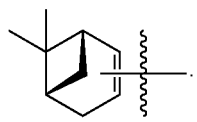

In some embodiments, R² is substituted with alkyl, alkoxy, arylsulfone, nitro, carbamate, OR³CF₃ or heteroaryl, wherein R³ is aryl.

In certain embodiments, provided herein, are compounds of Formula (V) having structures selected from:

B1
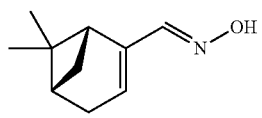
Molecular Weight: 165.24 ,

B3
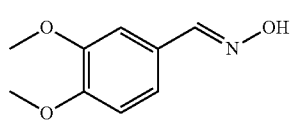
Molecular Weight: 181.19 ,

B103
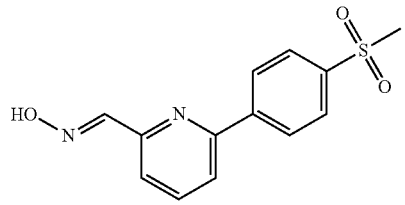
Molecular Weight: 276.31 ,

B12
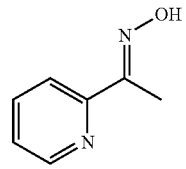
Molecular Weight: 136.15,

B10
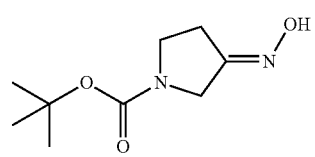
Molecular Weight: 200.24 ,

B97
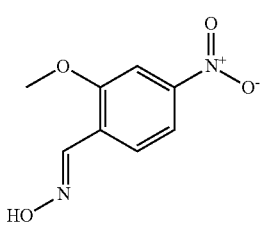
Molecular Weight: 196.16 ,

B7
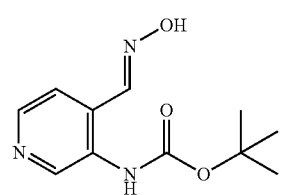
Molecular Weight: 237.26 ,

B100
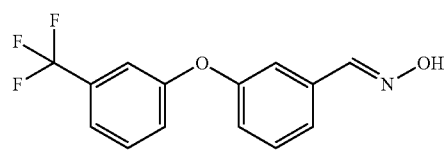
Molecular Weight: 281.23 ,

-continued

B11
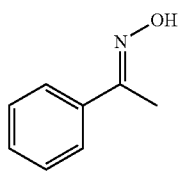
Molecular Weight: 135.17,

B9
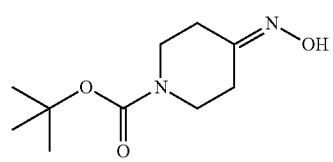
Molecular Weight: 214.27,

B98
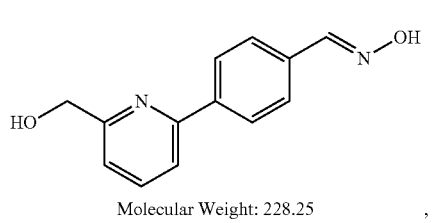
Molecular Weight: 228.25,

B101
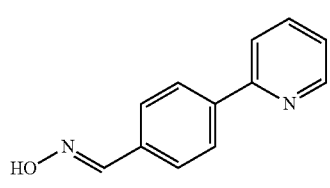
Molecular Weight: 198.23, and

B99
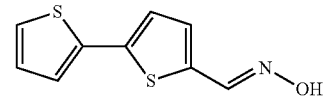
Molecular Weight: 209.28.

In certain aspects, provided herein, are compounds of Formula (VII), or a pharmaceutically acceptable salts thereof:

Formula (VII)
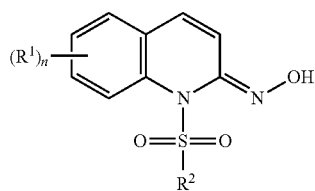

wherein each $R^1$ is independently selected from alkyl, cycloalkyl, halo, alkoxy, nitro, cyano, alkenyl, and alkynyl;

$R^2$ is selected from aryl, alkyl, heterocyclyl, heteroaryl, cycloalkyl, alkenyl, and alkynyl; and n is 0-6.

In some embodiments, n is 0.

In certain embodiments, the compounds have the structure of Formula (VIII):

Formula (VIII)
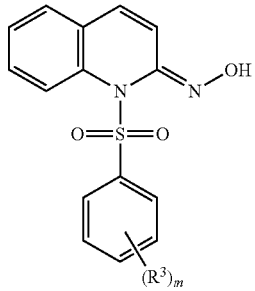

wherein each $R^3$ is independently selected from alkyl, cycloalkyl, halo, alkoxy, nitro, cyano, alkenyl, and alkynyl.

m is 0-5.

In certain embodiments, the compound have the structure:

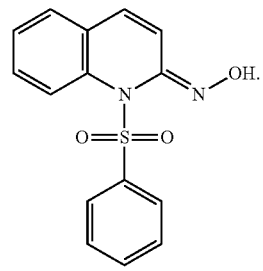 [SMILES: O=S(=O)(c1ccccc1)n1/c(=N/O)ccc2ccccc21]

In certain aspects, provided herein, are compounds of Formula (IX), or pharmaceutically acceptable salts thereof:

Formula (IX)
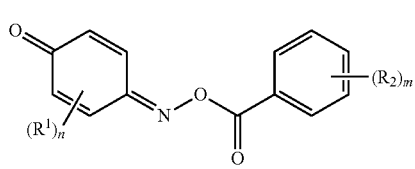

wherein each $R^1$ is independently selected from alkyl, cycloalkyl, halo, alkoxy, nitro, cyano, alkenyl, and alkynyl;

each $R^2$ is independently selected from alkyl, cycloalkyl, halo, alkoxy, nitro, cyano, alkenyl, and alkynyl;

n is 0-4; and m is 0-5.

In some embodiments, each $R^1$ is independently alkyl or cycloalkyl. In some embodiments, each $R^1$ is independently selected from methyl and cyclopropyl. In some embodiments, n is 2.

In certain embodiments, the compounds have the structure of Formula (X):

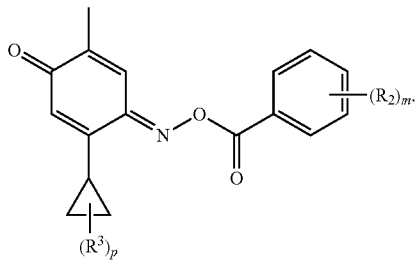

Formula (X)

wherein each $R^3$ is independently selected from alkyl, cycloalkyl, aryl, heteroaryl, halo, alkoxy, nitro, cyano, alkenyl, and alkynyl; or two $R^3$ taken together to form a ring; and p is 1-5.

In certain embodiments, the compounds have the structure of Formula (XI):

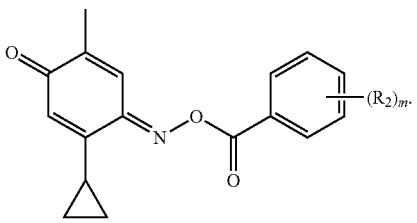

Formula (XI)

In some embodiments, each $R^2$ is nitro. In some embodiments, m is 1.

In certain embodiments, the compound has the structure:

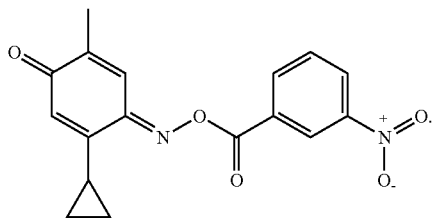

In certain embodiments, provided herein, are pharmaceutical compositions comprising any of the above compounds and a pharmaceutically acceptable excipient. In certain embodiments, provided herein are methods of treating a subject who has been exposed to an organophosphate comprising: administering to the subject any of the above compounds. In some embodiments, the organophosphate is a chemical nerve agent. In some embodiments, the chemical nerve agent is selected from sarin, soman, tabun and VX.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

All of the above, and any other publications, patents and published patent applications referred to in this application are specifically incorporated by reference herein. In case of conflict, the present specification, including its specific definitions, will control.

The term "agent" is used herein to denote a chemical compound (such as an organic or inorganic compound, a mixture of chemical compounds), a biological macromolecule (such as a nucleic acid, an antibody, including parts thereof as well as humanized, chimeric and human antibodies and monoclonal antibodies, a protein or portion thereof, e.g., a peptide, a lipid, a carbohydrate), or an extract made from biological materials such as bacteria, plants, fungi, or animal (particularly mammalian) cells or tissues. Agents include, for example, agents whose structure is known, and those whose structure is not known. The ability of such agents to inhibit AR or promote AR degradation may render them suitable as "therapeutic agents" in the methods and compositions of this disclosure.

A "patient," "subject," or "individual" are used interchangeably and refer to either a human or a non-human animal. These terms include mammals, such as humans, primates, livestock animals (including bovines, porcines, etc.), companion animals (e.g., canines, felines, etc.) and rodents (e.g., mice and rats).

"Treating" a condition or patient refers to taking steps to obtain beneficial or desired results, including clinical results. As used herein, and as well understood in the art, "treatment" is an approach for obtaining beneficial or desired results, including clinical results. Beneficial or desired clinical results can include, but are not limited to, alleviation or amelioration of one or more symptoms or conditions, diminishment of extent of disease, stabilized (i.e. not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival if not receiving treatment.

The term "preventing" is art-recognized, and when used in relation to a condition, such as a local recurrence (e.g., pain), a disease such as cancer, a syndrome complex such as heart failure or any other medical condition, is well understood in the art, and includes administration of a composition which reduces the frequency of, or delays the onset of, symptoms of a medical condition in a subject relative to a subject which does not receive the composition. Thus, prevention of cancer includes, for example, reducing the number of detectable cancerous growths in a population of patients receiving a prophylactic treatment relative to an untreated control population, and/or delaying the appearance of detectable cancerous growths in a treated population versus an untreated control population, e.g., by a statistically and/or clinically significant amount.

"Administering" or "administration of" a substance, a compound or an agent to a subject can be carried out using one of a variety of methods known to those skilled in the art. For example, a compound or an agent can be administered, intravenously, arterially, intradermally, intramuscularly, intraperitoneally, subcutaneously, ocularly, sublingually, orally (by ingestion), intranasally (by inhalation), intraspinally, intracerebrally, and transdermally (by absorption, e.g., through a skin duct). A compound or agent can also appropriately be introduced by rechargeable or biodegradable polymeric devices or other devices, e.g., patches and pumps, or formulations, which provide for the extended, slow or controlled release of the compound or agent.

Administering can also be performed, for example, once, a plurality of times, and/or over one or more extended periods.

Appropriate methods of administering a substance, a compound or an agent to a subject will also depend, for example, on the age and/or the physical condition of the subject and the chemical and biological properties of the compound or agent (e.g., solubility, digestibility, bioavailability, stability and toxicity). In some embodiments, a compound or an agent is administered orally, e.g., to a subject by ingestion. In some embodiments, the orally administered compound or agent is in an extended release or slow release formulation, or administered using a device for such slow or extended release.

As used herein, the phrase "conjoint administration" refers to any form of administration of two or more different therapeutic agents such that the second agent is administered while the previously administered therapeutic agent is still effective in the body (e.g., the two agents are simultaneously effective in the patient, which may include synergistic effects of the two agents).

For example, the different therapeutic compounds can be administered either in the same formulation or in separate formulations, either concomitantly or sequentially. Thus, an individual who receives such treatment can benefit from a combined effect of different therapeutic agents.

A "therapeutically effective amount" or a "therapeutically effective dose" of a drug or agent is an amount of a drug or an agent that, when administered to a subject will have the intended therapeutic effect. The full therapeutic effect does not necessarily occur by administration of one dose, and may occur only after administration of a series of doses. Thus, a therapeutically effective amount may be administered in one or more administrations. The precise effective amount needed for a subject will depend upon, for example, the subject's size, health and age, and the nature and extent of the condition being treated, such as cancer or MDS. The skilled worker can readily determine the effective amount for a given situation by routine experimentation.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present disclosure can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—$CH_2$—O-alkyl, —OP(O)(O-alkyl)$_2$ or —$CH_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In preferred embodiments, a straight chain or branched chain alkyl has 30 or fewer carbon atoms in its backbone (e.g., $C_{1-30}$ for straight chains, $C_{3-30}$ for branched chains), and more preferably 20 or fewer. The term "lower alkyl" refers to the alkyl group with 1-6 carbon atoms. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like.

Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "$C_{x-y}$" or "$C_x$-$C_y$", when used in conjunction with a chemical moiety, such as, acyl, acyloxy, alkyl, alkenyl, alkynyl, or alkoxy is meant to include groups that contain from x to y carbons in the chain. $C_0$alkyl indicates a hydrogen where the group is in a terminal position, a bond if internal. A $C_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS—.

The term "amide", as used herein, refers to a group

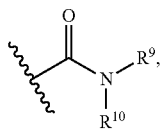

wherein $R^9$ and $R^{10}$ each independently represent a hydrogen or hydrocarbyl group, or $R^9$ and $R^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

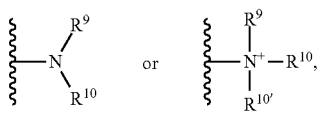

wherein $R^9$, $R^{10}$, and $R^{10'}$ each independently represent a hydrogen or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

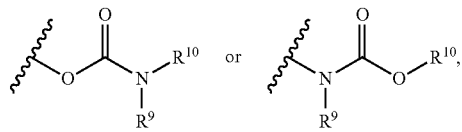

wherein $R^9$ and $R^{10}$ independently represent hydrogen or a hydrocarbyl group.

The term "carbocyclylalkyl", as used herein, refers to an alkyl group substituted with a carbocycle group.

The term "cycloalkyl", as used herein refers to a monocyclic or polycyclic non-aromatic ring, wherein each of the atoms forming the ring (i.e. skeletal atoms) is a carbon atom. Cycloalkyls may be saturated, or partially unsaturated. Cycloalkyls may be fused with an aromatic ring (in which case the cycloalkyl is bonded through a non-aromatic ring carbon atom). Representative cycloalkyls include, but are not limited to, cycloalkyls having from three to ten carbon atoms, from three to eight carbon atoms, from three to six carbon atoms, or from three to five carbon atoms. Monocyclic cycloalkyl rings include, for example, cyclopropyl, cyclobutyl, cyclopentyl, cyclohexyl, cycloheptyl, and cyclooctyl. In some embodiments, the monocyclic cycloalkyl is cyclopropyl, cyclobutyl, cyclopentyl or cyclohexyl. Polycyclic rings include, for example, adamantyl, norbornyl, decalinyl, and 3,4-dihydronaphthalen-1(2H)-one. Unless otherwise stated specifically in the specification, a cycloalkyl group may be optionally substituted. The terms "cycloalkyl" also include polycyclic ring systems having two or more cyclic rings in which two or more carbons are common to two adjoining rings wherein at least one of the rings is cycloalkyl, e.g., the other cyclic rings can be cycloalkyls, cycloalkenyls, cycloalkynyls, aryls, heteroaryls, and/or heterocyclyls.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

The term "carbocyclylalkyl", as used herein, refers to an alkyl group substituted with a carbocycle group.

The term "carbonate" is art-recognized and refers to a group —OCO$_2$—.

The term "carboxy", as used herein, refers to a group represented by the formula —CO$_2$H.

The term "ester", as used herein, refers to a group —C(O)OR$^9$ wherein R$^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —OSO$_3$H, or a pharmaceutically acceptable salt thereof.

The term "sulfonamide" is art-recognized and refers to the group represented by the general formulae

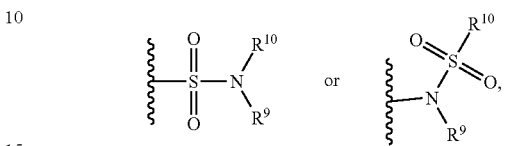

wherein R$^9$ and R$^{10}$ independently represents hydrogen or hydrocarbyl.

The term "sulfoxide" is art-recognized and refers to the group -S(O)—.

The term "sulfonate" is art-recognized and refers to the group SO$_3$H, or a pharmaceutically acceptable salt thereof.

The term "sulfone" is art-recognized and refers to the group —S(O)$_2$—.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this disclosure, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group —C(O)SR$^9$ or —SC(O)R$^9$ wherein R$^9$ represents a hydrocarbyl.

The term "thioether", as used herein, is equivalent to an ether, wherein the oxygen is replaced with a sulfur.

The term "urea" is art-recognized and may be represented by the general formula

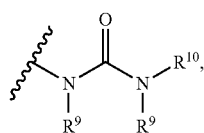

wherein R⁹ and R¹⁰ independently represent hydrogen or a hydrocarbyl.

The term "modulate" as used herein includes the inhibition or suppression of a function or activity (such as cell proliferation) as well as the enhancement of a function or activity.

The phrase "pharmaceutically acceptable" is art-recognized. In certain embodiments, the term includes compositions, excipients, adjuvants, polymers and other materials and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

"Pharmaceutically acceptable salt" or "salt" is used herein to refer to an acid addition salt or a basic addition salt which is suitable for or compatible with the treatment of patients.

The term "pharmaceutically acceptable acid addition salt" as used herein means any non-toxic organic or inorganic salt of any base compounds represented by Formula I. Illustrative inorganic acids which form suitable salts include hydrochloric, hydrobromic, sulfuric and phosphoric acids, as well as metal salts such as sodium monohydrogen orthophosphate and potassium hydrogen sulfate. Illustrative organic acids that form suitable salts include mono-, di-, and tricarboxylic acids such as glycolic, lactic, pyruvic, malonic, succinic, glutaric, fumaric, malic, tartaric, citric, ascorbic, maleic, benzoic, phenylacetic, cinnamic and salicylic acids, as well as sulfonic acids such as p-toluene sulfonic and methanesulfonic acids. Either the mono or di-acid salts can be formed, and such salts may exist in either a hydrated, solvated or substantially anhydrous form. In general, the acid addition salts of compounds of Formula I are more soluble in water and various hydrophilic organic solvents, and generally demonstrate higher melting points in comparison to their free base forms. The selection of the appropriate salt will be known to one skilled in the art. Other non-pharmaceutically acceptable salts, e.g., oxalates, may be used, for example, in the isolation of compounds of Formula I for laboratory use, or for subsequent conversion to a pharmaceutically acceptable acid addition salt.

The term "pharmaceutically acceptable basic addition salt" as used herein means any non-toxic organic or inorganic base addition salt of any acid compounds represented by Formula I or any of their intermediates. Illustrative inorganic bases which form suitable salts include lithium, sodium, potassium, calcium, magnesium, or barium hydroxide. Illustrative organic bases which form suitable salts include aliphatic, alicyclic, or aromatic organic amines such as methylamine, trimethylamine and picoline or ammonia. The selection of the appropriate salt will be known to a person skilled in the art.

Many of the compounds useful in the methods and compositions of this disclosure have at least one stereogenic center in their structure. This stereogenic center may be present in a R or a S configuration, said R and S notation is used in correspondence with the rules described in Pure Appl. Chem. (1976), 45, 11-30. The disclosure contemplates all stereoisomeric forms such as enantiomeric and diastereoisomeric forms of the compounds, salts, prodrugs or mixtures thereof (including all possible mixtures of stereoisomers). See, e.g., WO 01/062726.

Furthermore, certain compounds which contain alkenyl groups may exist as Z (zusammen) or E (entgegen) isomers. In each instance, the disclosure includes both mixture and separate individual isomers.

Some of the compounds may also exist in tautomeric forms. Such forms, although not explicitly indicated in the formulae described herein, are intended to be included within the scope of the present disclosure.

"Prodrug" or "pharmaceutically acceptable prodrug" refers to a compound that is metabolized, for example hydrolyzed or oxidized, in the host after administration to form the compound of the present disclosure (e.g., compounds of formula I). Typical examples of prodrugs include compounds that have biologically labile or cleavable (protecting) groups on a functional moiety of the active compound. Prodrugs include compounds that can be oxidized, reduced, aminated, deaminated, hydroxylated, dehydroxylated, hydrolyzed, dehydrolyzed, alkylated, dealkylated, acylated, deacylated, phosphorylated, or dephosphorylated to produce the active compound. Examples of prodrugs using ester or phosphoramidate as biologically labile or cleavable (protecting) groups are disclosed in U.S. Pat. Nos. 6,875,751, 7,585,851, and 7,964,580, the disclosures of which are incorporated herein by reference. The prodrugs of this disclosure are metabolized to produce a compound of Formula I. The present disclosure includes within its scope, prodrugs of the compounds described herein. Conventional procedures for the selection and preparation of suitable prodrugs are described, for example, in "Design of Prodrugs" Ed. H. Bundgaard, Elsevier, 1985.

The phrase "pharmaceutically acceptable carrier" as used herein means a pharmaceutically acceptable material, composition or vehicle, such as a liquid or solid filter, diluent, excipient, solvent or encapsulating material useful for formulating a drug for medicinal or therapeutic use.

The term "Log of solubility", "Log S" or "log S" as used herein is used in the art to quantify the aqueous solubility of a compound. The aqueous solubility of a compound significantly affects its absorption and distribution characteristics. A low solubility often goes along with a poor absorption. Log S value is a unit stripped logarithm (base 10) of the solubility measured in mol/liter.

EXAMPLES

Example 1: Validating the Efficacy of Oxime Compounds

The first step for validating the efficacy of E)-N-(2,4-dinitrophenoxy)-1-(4-fluorophenyl)methanimine and (NE)-N-[1-(benzenesulfonyl)quinolin-2-ylidene]hydroxylamine as antidotes for different OPs is to assess their chemical properties following the protocol below:
1. Determine the melting point of the oxime:
   Take a small amount of the synthesized oxime (around 1-2 mg) and place it in a capillary tube.
   Heat the capillary tube using a melting point apparatus or a Bunsen burner and observe the temperature at which the oxime melts. This can give you an indication of the purity of the oxime and whether it has undergone any decomposition or reaction.

2. Determine the solubility of the oxime in different solvents:
    Prepare a range of solvents of varying polarities such as water, ethanol, methanol, DMSO, and chloroform.
    Take a small amount of the synthesized oxime (around 5-10 mg) and add it to each solvent in separate test tubes or vials.
    Shake the test tubes or vials vigorously to dissolve the oxime in the solvents.
    Observe the solution in each test tube or vial and note whether the oxime dissolves completely or partially or forms a suspension or precipitate.
    Repeat the solubility test at different temperatures (e.g. room temperature, 50° C., 80° C.) to assess the effect of temperature on the solubility of the oxime.
3. Determine the pH-dependent solubility of the oxime:
    Prepare a series of buffer solutions of different pH values (e.g. pH 2, 4, 6, 8, 10) using appropriate buffer systems such as acetate buffer, phosphate buffer, or Tris buffer.
    Take a small amount of the synthesized oxime (around 5-10 mg) and add it to each buffer solution in separate test tubes or vials.
    Shake the test tubes or vials vigorously to dissolve the oxime in the buffer solutions.
    Observe the solution in each test tube or vial and note whether the oxime dissolves completely or partially or forms a suspension or precipitate.
    Repeat the solubility test at different temperatures (e.g. room temperature, 50° C., 80° C.) to assess the effect of temperature on the pH-dependent solubility of the oxime.
4. Determine the stability of the oxime in different solvents:
    Take a small amount of the synthesized oxime (around 5-10 mg) and add it to each solvent in separate test tubes or vials.
    Store the test tubes or vials at different temperatures (e.g. room temperature, 4° C., −20° C.) for different time periods (e.g. 24 hours, 48 hours, 7 days).
    Observe the solution in each test tube or vial and note whether the oxime remains stable or undergoes any degradation or precipitation.
5. Analyze the data:
    Record the results of the solubility and stability tests in a spreadsheet.
    Calculate the solubility parameters such as the solubility product (Ksp) or the solubility index (SI) for each solvent and pH condition.
    Compare the solubility parameters and stability data with literature values for similar oxime compounds to assess the quality and suitability of the synthesized oxime.

Example 2: Efficacy Study

The efficacy of the new oxime against different OPs can be assessed through the following protocol:
1. Generate IPSC-derived neurons: We can use commercially available IPSC lines or generate them from patient-derived cells through one of Prepaire's partners such as NCARDIA.
2. Induce organophosphate poisoning:
    Plate IPSC-derived neurons in multi-well plates or culture dishes at an appropriate density.
    Prepare a stock solution of the organophosphate agent (e.g. VX or Sarin gas) at different concentrations in a suitable solvent (e.g. DMSO, ethanol).
    Dilute the stock solution of the organophosphate agent in the culture medium to the desired final concentration.
    Add the diluted organophosphate solution to the culture medium to induce organophosphate poisoning in the IPSC-derived neurons. Incubate for the desired duration (e.g. 5 minutes, 1, 4, 8, and 24 hours).
3. Test the antidote molecule:
    Prepare a stock solution of the antitoxine molecule at a known concentration in a suitable solvent (e.g. DMSO, ethanol or water as per the chemical protocol above).
    Dilute the stock solution of the antitoxine molecule in the culture medium to the desired final concentration (as per the chemical protocol above).
    Add the diluted antidote solution to the culture medium at different time points (e.g. before organophosphate exposure, during organophosphate exposure, after organophosphate exposure).
    Incubate the IPSC-derived neurons with the antidote solution for the desired duration (e.g. 5 minutes, 1, 4, 8, and 24 hours).
    To measure the efficacy of the antidote, we can use different assays such as: o Cell viability assays (e.g. MTT assay, LDH release assay)
    Mitochondrial function assays (e.g. mitochondrial membrane potential assay). This assay is particularly relevant for our purpose.
    Oxidative stress assays (e.g. ROS detection assay or glutathione assay)
    Gene expression analysis (e.g. qPCR)
4. Compare with existing antidotes:
    Prepare a stock solution of the existing antidotes (2-PAM and Obidoxime) at known concentrations in suitable solvents (DMSO, ethanol, or water).
    Dilute the stock solutions of the existing antidotes in the culture medium to the desired final concentrations.
    Add the diluted solutions of the existing antidotes to the IPSC-derived neurons at different time points (e.g. 5 minutes, 1, 4, 8, and 24 hours).
    Incubate the IPSC-derived neurons with the existing antidotes for the desired duration (e.g. 5 minutes, 1, 4, 8, and 24 hours).
    Use the same assays as in step 3 to measure the efficacy of the existing antidotes.
5. Statistical analysis: Analyze the data using ANOVA, t-tests, or, if necessary, Mann-Whitney U test.
    Compare the results between the different treatments (e.g. antitoxine molecule, 2-PAM, Obidoxime, and control) and determine the statistical significance of the differences.
    Repeat the experiments multiple at least 5 times to ensure reproducibility and reliability of the results.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method of treating a subject who has been exposed to an organophosphate comprising: administering to the subject a compound of Formula (III), or a pharmaceutically acceptable salt thereof:

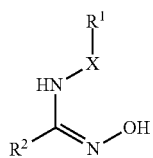

Formula (III)

wherein X is a bond or SO$_2$;
R$^1$ is selected from H, alkyl, aryl, and cycloalkyl; and
R$^2$ is aryl.

2. The method of claim 1, wherein the compound of Formula (III) is a compound of Formula (IV), or a pharmaceutically acceptable salt thereof:

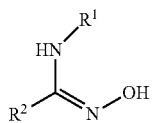

Formula (IV)

wherein R$^1$ is aryl.

3. The method of claim 1, wherein R$^2$ is

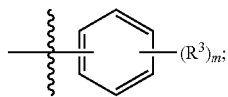

wherein each R$^3$ is independently selected from nitro, cyano, halo, haloalkyl, and alkyl; and
m is an integer from 0-5.

4. A compound having a structure selected from:

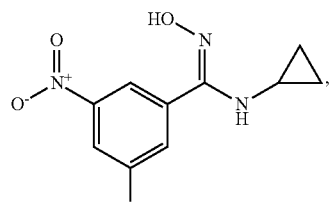

Molecular Weight: 300.11

B23

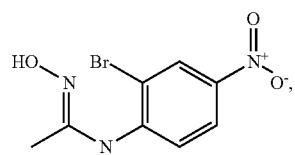

Molecular Weight: 274.07

B26

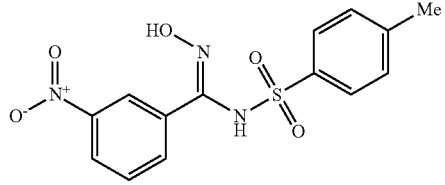

Molecular Weight: 335.33

B82

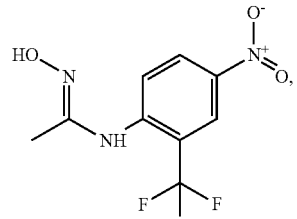

Molecular Weight: 263.18

B20

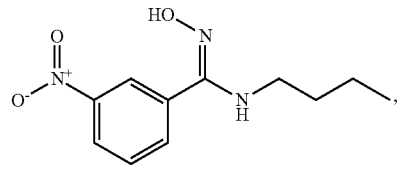

Molecular Weight: 237.26

B21

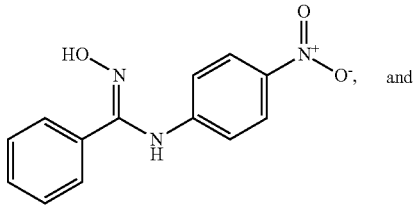

Molecular Weight: 257.25

B25

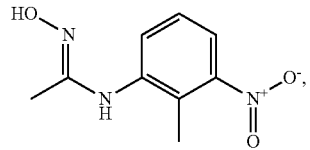

Molecular Weight: 209.21

B22 or a pharmaceutically acceptable salt thereof.

5. A method of treating a subject who has been exposed to an organophosphate comprising: administering to the subject a compound having a structure selected from:

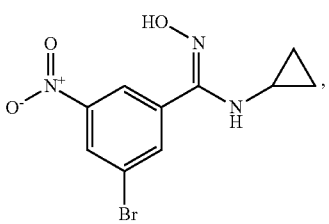

Molecular Weight: 300.11

B23

-continued
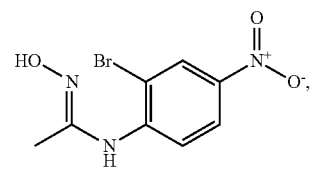
Molecular Weight: 274.07
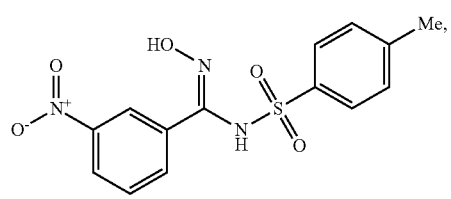
Molecular Weight: 335.33
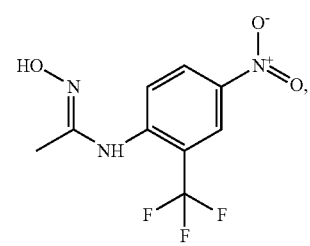
Molecular Weight: 263.18
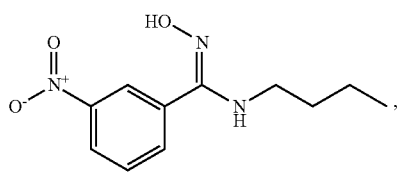
Molecular Weight: 237.26
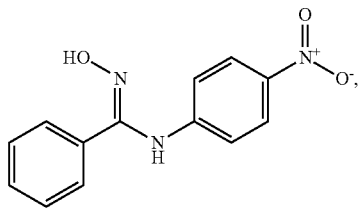
Molecular Weight: 257.25
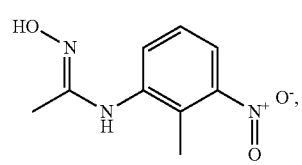
Molecular Weight: 209.21
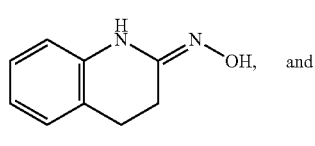
Molecular Weight: 162.19
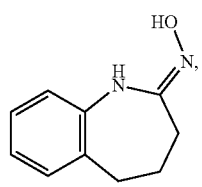
Molecular Weight: 176.22
or a pharmaceutically acceptable salt thereof.
* * * * *